Feb. 20, 1945.  G. F. MOORE  2,369,791
PROCESS FOR PRODUCING HYDROFLUOSILICIC ACID AND OR FLUOSILICATES
Filed Jan. 7, 1943
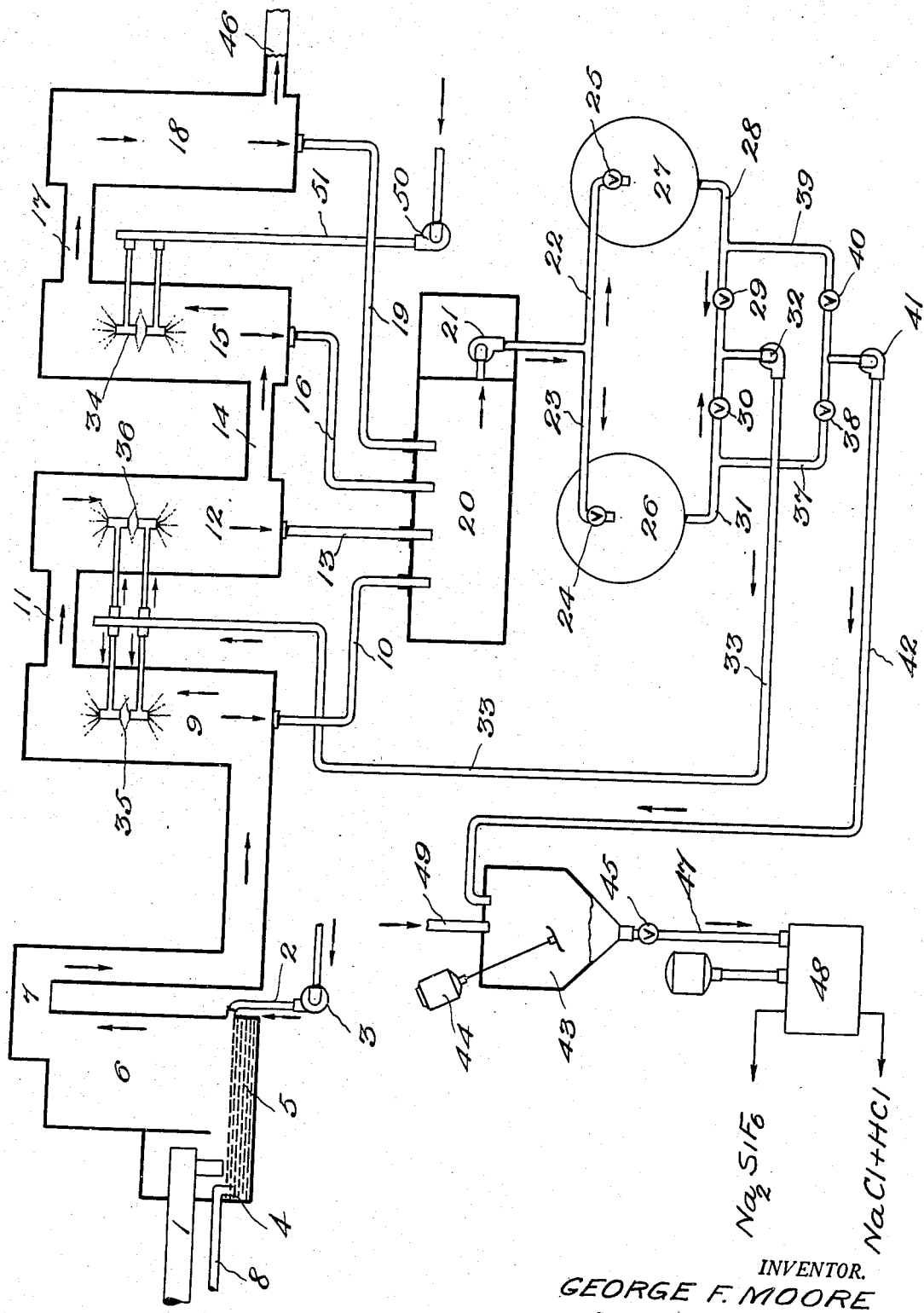
INVENTOR.
GEORGE F. MOORE
BY
ATTORNEY Patented Feb. 20, 1945

2,369,791

UNITED STATES PATENT OFFICE 2,369,791

PROCESS FOR PRODUCING HYDROFLUOSILICIC ACID AND/OR FLUOSILICATES

George F. Moore, Tampa, Fla., assignor to Tennessee Corporation, a corporation of New York Application January 7, 1943, Serial No. 471,526

3 Claims. (Cl. 23—88)

The present invention relates to the production of fluosilicic acid and fluosilicates and more particularly to the recovery of fluosilicic acid and fluosilicates from vapors containing hydrofluoric acid, silicon tetrafluoride and steam vapor.

It is an object of the present invention to provide a means for recovering fluosilicic acid and or fluosilicates from gases containing hydrofluoric acid, silicon tetrafluoride and water vapor.

It is another object of the present invention to provide a means for recovering fluosilicic acid and fluosilicates from gases and or vapors produced in the concentration of relatively dilute phosphoric acid containing compounds of fluorine and of silicon.

It is a further object of the present invention to recover fluosilicic acid and fluosilicates from gases containing hydrofluoric acid, silicon tetrafluoride and water vapor wherein the liquid water content of the vapors is controlled within a critical range.

The present invention likewise contemplates the production of sodium fluosilicate from the vapors evolved during the concentration of relatively dilute phosphoric acid.

Other objects and advantages of the present invention will become apparent from the following description taken in conjunction with the drawing which is a more or less diagrammatic flow sheet illustrating the application of the principles of the present invention to a particular embodiment thereof.

Broadly stated the present invention involves the production of fluosilicic acid and or fluosilicates from vapors containing compounds of fluorine and of silicon, particularly hydrofluoric acid and silicon tetrafluoride, together with water vapor.

It has been discovered that in the conventional process the silicon tetrafluoride decomposes to precipitate hydrated silicic acid when the liquid water content of the gases exceeds a critical maximum content. It was also discovered that when the temperature of the gases containing hydrofluoric acid, silicon tetrafluoride and water vapor drops below a critical minimum the silicon tetrafluoride decomposes with the formation of silica. The silica produced by the foregoing decomposition clogs the filter and filtration of the hydrofluosilicic acid becomes exceedingly difficult if not impossible. It was found that by keeping the temperature of the gases above about 200° F. the decomposition of the silicon tetrafluoride could be overcome and loss of hydrofluosilicic acid avoided.

Another advantage is derived from the present invention in that the production of hydrofluoric acid is overcome. When silicon tetrafluoride hydrolyzes or decomposes to produce silica, it upsets the proportion of silicon tetrafluoride and hydrofluoric acid gases in the system and leaves an excess of hydrofluoric acid. In the conventional process for producing hydrofluosilicic acid and or fluosilicates from hydrofluoric acid and silicon tetrafluoride, the decomposition or hydrolysis of the silicon tetrafluoride produces free hydrofluoric acid in addition to silica. In the conventional process this free hydrofluoric acid passes out of the reaction system. It is well known that, in addition to the monetary loss involved in the loss of the free hydrofluoric acid, due to its poisonous and corroding effect the escape of free hydrofluoric acid is very objectionable.

A conventional source of hydrofluosilicic acid and fluosilicates are the gases or vapors produced in the concentration of relatively dilute phosphoric acid containing compounds of fluorine and of silicon. It is believed that the silicon and fluorine are present in the dilute phosphoric acid as hydrofluosilicic acid. When the phosphoric acid is heated to concentrate the same the hydrofluosilicic acid breaks up into hydrofluoric acid and silicon tetrafluoride. When the liquid water content of the gases rises above a critical maximum the silicon tetrafluoride decomposes to form silica and hydrofluoric acids. The condensation of the water vapor to liquid water can be avoided by maintaining the temperature of the gases above about 230 degrees F. and preferably at about 240 degrees to 250 degrees F. A practical means of maintaining the optimum conditions to eliminate condensation of the water vapor and hydrolysis of the silicon tetrafluoride is to discharge the concentrated phosphoric acid at a density of about 55 degrees to about 56 degrees Baumé at 210 degrees F. When the phosphoric acid is discharged from the concentrators at this density at 210 degrees F. the outlet temperature of the gas from the concentrators is about 240 degrees to about 250 degrees F. Accordingly, another practical means of control is to maintain a temperature of at least about 240 degrees at the outlet of the concentrators.

The process of recovering hydrofluosilicic acid in accordance with the principles of the present invention may be carried out and preferably is carried out in accordance with the flow sheet depicted in the figure. Relatively dilute phosphoric acid, 27 to 33° Bé. and preferably 33° Bé. is pumped into the concentrator pan 5 by means of pump 3 through inlet 2. The phosphoric acid containing compounds of fluorine and probably in the form of hydrofluosilicic acid is boiled by means of hot gases from an oil burner (not shown) introduced onto the surface of the acid by means of the gas inlet manifold 1. The concentrated phosphoric acid substantially devoid of fluorine compounds and of silicon and having a density preferably of 55° Bé. at 210° F. is withdrawn from the concentrator pan thru the seal 4 and launder 8.

During the concentration of the phosphoric acid the vapors of hydrofluoric acid, silicon tetrafluoride and water, along with some phosphoric acid vapors, rise thru the tower 6 and pass by means of conduit 7 to the first scrubbing tower 9 maintained at a temperature of about 165° F. The hydrofluosilic acid formed by the reaction between hydrofluoric acid and silicon tetrafluoride is removed through duct and gas seal 10 to the common tank 20. The uncondensed hydrofluosilicic acid with the other vapors pass out of the scrubber 9 by means of conduit 11 to scrubber 12. The condensed hydrofluosilicic acid from scrubber 12 is withdrawn through gas seal and pipe 13 to tank 20. The uncondensed hydrofluosilicic acid and other vapors pass from scrubber 12 by means of conduit 14 to scrubber 15 and pass upwards countercurrently thru water atomized into the tower by means of pump 50 and conduit 51 thru sprays 34. The condensed weak fluosilicic acid is withdrawn through pipe and gas seal 16 to tank 20.

The vapors substantially free of fluorine compounds except for entrained liquid pass through conduit 17 into tower 18 where substantially all the entrained liquid (weak H₂SiF₆) is trapped and withdrawn through pipe and seal 19 to tank 20 from the tower 18. The vapors then substantially free of fluorine compounds and entrainment pass into the Cottrell precipitator (not shown) through conduit 46.

The combined acids from the four towers in tank 20 are pumped by means of pump 21 thru pipe 22 and control valve 25 into tank 27 or through pipe 23 and control valve 24 into tank 26. Tanks 26 and 27 contain sand filters through which the acid must pass. The clear acid is pumped from these tanks by means of pump 32 through pipes 31 and control valve 30 or pipe 28 and control valve 29 through pipe 33 to recirculating sprays 35 in tower 9 and recirculating sprays 36 in tower 12. The acid is recirculated until the concentration is 16% to 19% and preferably 17.5%.

The amount of water atomized into the tower 15 depends upon the amount of fluorine which is in the gases entering the absorber and which is to be absorbed, the percentage of water vapor in the gases coming from the concentrators, and the strength of the hydrofluosilicic acid to be produced. In other words, sufficient water is atomized into the tower 15 to practically completely saturate the gases entering therein plus a sufficient amount of water, dependent upon the amount of fluorine in the gases, to produce the desired concentration of hydrofluosilicic acid. It has been found that dependent upon the volume of gas treated and the fluorine concentration thereof that about 10 to about 30 gallons of water and generally about 20 gallons of water per minute are atomized into the absorber or tower 15 to produce 17.5% acid.

When tank 26 or 27 is full of the desired strength acid it is pumped by means of pump 41 through pipe 37 and control valve 38 or pipe 39 and control valve 40 through pipe 42 to the reaction tank 43. When the desired amount has been pumped into tank 43, salt brine in calculated amount is pumped into the tank through conduit 49, the contents of which are agitated by means of stirrer 44 until the reaction is complete. The reaction mixture is withdrawn from the reaction tank through pipe 47 and control valve 45 to centrifuge 48, or other means by which the precipitated sodium fluosilicate is separated from the reaction liquids NaCl, brine and HCl. Preferably the hydrofluosilicic acid is recovered as a salt of the acid by the addition of a water soluble salt of the metal of which it is desired to recover the fluosilicate. Accordingly, compounds other than alkali metal salts may be employed to produce the fluosilicate of the cation of the compound added. That is, a compound of the cation of the fluosilicate to be produced is added to the concentrated solution of hydrofluoric acid.

Several advantages arise from the present invention. Of considerable importance is the improved quality of phosphoric acid so produced. Furthermore, a higher yield of hydrofluosilicic acid is obtained. In addition there is little or no precipitation of silica or silicic acid and substantially no hydrofluoric acid is set free. It is to be noted that in contrast to the conventional method of absorbing the hydrofluosilicic acid in which the hydrofluosilicic acid is absorbed in towers 15 and 18, in the present process practically all of the hydrofluosilicic acid is absorbed in towers 9 and 12. It is to be noted that it is believed that the novel results obtained by the present process result from the prevention of the hydrolysis of silicon tetrafluoride by condensed water vapor or water in the liquid state. That is to say, in accordance with the principles of the present invention the amount of water in the liquid state in the gases or vapors in towers 9 and 12 is kept below a critical maximum and in contrast to prior art processes the major portion of the moisture in the gases in towers 9 and 12 is kept in the vapor state. While it is believed at this time that the foregoing hypothesis explains the unusual novel results obtained by the novel process nevertheless the foregoing disclosure and the appended claims are in no way limited by this hypothesis.

Although the invention has been described in conjunction with a particular embodiment thereof, those skilled in the art will understand that variations and modifications can be made. Such variations and modifications are to be considered within the purview of the specification and the scope of the appended claims. Thus, while the recovery of hydrofluosilicic acid as sodium fluosilicate has been described hereinbefore, it is to be understood that the hydrofluosilicic acid may be recovered as such or as fluosilicates other than those of the alkali metals.

I claim:

1. In the process for recovering fluorine and silicon as a compound selected from the group consisting of fluosilicic acid and fluosilicates which involves heating an aqueous solution to produce vapors containing hydrofluoric acid, silicon tetrafluoride and water vapor and scrubbing said solution with water to remove said fluorine and said silicon, the improvement which comprises maintaining the temperature of said vapors above about 230° F.

2. In the process for recovering fluorine and silicon as a compound selected from the group consisting of fluosilicic acid and fluosilicates which involves heating an aqueous solution to produce vapors containing hydrofluoric acid, silicon tetrafluoride and water vapor and scrubbing said solution with water to remove said fluorine and said silicon, the improvement which comprises maintaining the temperature of said vapors at about 240° F. to about 250° F.

3. In the process for concentrating dilute phosphoric acid containing compounds of fluorine and silicon to recover said fluorine and silicon which involves heating said dilute phosphoric acid to produce gases containing hydrofluoric acid, silicon tetrafluoride, and water vapor and scrubbing said gases with water to remove said fluorine and silicon, the improvement which comprises maintaining the temperature of said gases as evolved from said heating step at a temperature of about 240° F. to about 250° F.

GEORGE F. MOORE.